US010385171B2

(12) United States Patent
Yoshikawa et al.

(10) Patent No.: US 10,385,171 B2
(45) Date of Patent: Aug. 20, 2019

(54) POWDER COMPRISING HYDROLYZABLE RESIN PARTICLES

(71) Applicant: TOYO SEIKAN GROUP HOLDINGS, LTD., Tokyo (JP)

(72) Inventors: Seishi Yoshikawa, Yokohama (JP); Toshiki Yamada, Yokohama (JP); Tsutaki Katayama, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 237 days.

(21) Appl. No.: 15/508,997

(22) PCT Filed: Aug. 11, 2015

(86) PCT No.: PCT/JP2015/072727
§ 371 (c)(1),
(2) Date: Mar. 8, 2017

(87) PCT Pub. No.: WO2016/039061
PCT Pub. Date: Mar. 17, 2016

(65) Prior Publication Data
US 2017/0253703 A1    Sep. 7, 2017

(30) Foreign Application Priority Data
Sep. 9, 2014   (JP) .................. 2014-183305

(51) Int. Cl.
| | |
|---|---|
| C08J 3/12 | (2006.01) |
| C08L 67/04 | (2006.01) |
| C09K 8/035 | (2006.01) |
| C08K 5/11 | (2006.01) |
| C08L 101/16 | (2006.01) |
| C09K 8/508 | (2006.01) |
| C09K 8/516 | (2006.01) |
| C09K 8/68 | (2006.01) |
| C09K 8/70 | (2006.01) |
| C09K 8/88 | (2006.01) |
| C09K 8/92 | (2006.01) |
| E21B 43/16 | (2006.01) |

(52) U.S. Cl.
CPC . *C08J 3/12* (2013.01); *C08K 5/11* (2013.01); *C08L 67/04* (2013.01); *C08L 101/16* (2013.01); *C09K 8/035* (2013.01); *C09K 8/5086* (2013.01); *C09K 8/516* (2013.01); *C09K 8/68* (2013.01); *C09K 8/70* (2013.01); *C09K 8/885* (2013.01); *C09K 8/92* (2013.01); *C08J 2300/20* (2013.01); *C08J 2367/04* (2013.01); *C08J 2401/10* (2013.01); *E21B 43/16* (2013.01)

(58) Field of Classification Search
None
See application file for complete search history.

(56) References Cited

U.S. PATENT DOCUMENTS

| | | | |
|---|---|---|---|
| 7,833,950 B2 | 11/2010 | Willberg et al. | |
| 2011/0300269 A1* | 12/2011 | Dale | C10L 5/363 426/96 |
| 2013/0133887 A1 | 5/2013 | Todd | |
| 2013/0196398 A1* | 8/2013 | Bals | C12P 19/14 435/160 |
| 2013/0309497 A1* | 11/2013 | Takezaki | C08J 3/14 428/402 |
| 2015/0361326 A1 | 12/2015 | Masaki et al. | |

FOREIGN PATENT DOCUMENTS

| | | | |
|---|---|---|---|
| CN | 103930515 A | 7/2014 | |
| JP | 08-034019 A | 2/1996 | |
| JP | 3831278 | 10/2006 | |
| JP | 2007-231154 A | 9/2007 | |
| JP | 2009-185227 A | 8/2009 | |
| JP | 2010-126619 A | 6/2010 | |
| JP | 5093834 | 12/2012 | |
| JP | 2013-136732 A | 7/2013 | |
| WO | 2012/105140 A1 | 8/2012 | |
| WO | WO-2012105140 A1 * | 8/2012 | ................ C08J 3/14 |
| WO | 2014/112479 A1 | 7/2014 | |

OTHER PUBLICATIONS

Sigma Aldrich Particle and Mesh Size Chart, Downloaded Dec. 26, 2018. (Year: 2018).*
Communication dated May 25, 2018, issued by the State Intellectual Property Office of the P.R.C. in corresponding Chinese Application No. 201580048401.7.
International Search Report for PCT/JP2015/072727 dated Nov. 10, 2015.
Extended European Search Report dated Mar. 6, 2018 issued by the European Patent Office in counterpart European application No. 15839330.6.
Ileleji K et al. "The angle of repose of bulk corn stover particles", Powder Technology, vol. 187, No. 2, Oct. 28, 2008, pp. 110-118 (9 pages total).
Zewei Miao et al. "Flow performance of ground biomass in a commercial auger", Powder Technology, vol. 267, Aug. 2, 2014, pp. 354-361 (8 pages total).

* cited by examiner

*Primary Examiner* — Christopher M Rodd
(74) *Attorney, Agent, or Firm* — Sughrue Mion, PLLC

(57) ABSTRACT

A powder comprising hydrolyzable resin particle, containing particles which do not pass through a sieve having an opening size of 500 μm in an amount of 50 mass % or more and having a repose angle of 51° or more. This powder is preferably used as an additive for drilling to enhance the drilling properties of a drilling fluid and improve the retentivity of a fracture extending from a winze.

6 Claims, 4 Drawing Sheets

(PARTICLES OF EXAMPLE 1)

(WHISKERED PARTICLES CONTAINED IN EXAMPLE 1)

(WHISKERED PARTICLES CONTAINED IN EXAMPLE 2)

(PARTICLES OF COMPARATIVE EXAMPLE 2)

(MOBILITY IN WATER OF PARTICLES OF EXAMPLE 1)

(MOBILITY IN WATER OF PARTICLES OF COMPARATIVE EXAMPLE 2)

POWDER COMPRISING HYDROLYZABLE RESIN PARTICLES

TECHNICAL FIELD

The present invention relates to a powder comprising hydrolyzable resin particles.

BACKGROUND ART

Hydrolyzable resins typified by polylactic acid are excellent in biodegradability and are now under study as substitutes for various plastics in various application fields from the viewpoint of environmental improvement, and some of them have been put to practical use.

In recent years, use of the resins as additives to be added to drilling fluids used to extract underground resources has been proposed (refer to Patent Document 1).

For example, a winze drilling method called "hydraulic fracturing method" is now widely employed to extract underground resources. In this drilling method, a high pressure is applied to a drilling fluid filled in a winze to form cracks (fractures) in the vicinity of the winze so as to improve permeability (ease of the fluid's flow) in the vicinity of the winze and to expand the effective sectional area through which a resource such as oil or gas flows into the winze, thereby increasing the productivity of the winze. This drilling fluid is also called "fracturing fluid", and a viscous fluid such as gel-like gasoline was used. However, an aqueous dispersion prepared by dissolving or dispersing polymer particles in water has recently been used due to the development of shale gas produced from shale strata existent at relatively shallow sites in consideration of an influence on the environment. A hydrolyzable resin such as polylactic acid is proposed as this polymer.

That is, polylactic acid is a substance which exhibits hydrolyzability and biodegradability and is decomposed by water or an enzyme contained in the ground even if it remains in the ground and therefore does not exert a bad influence on the environment. Water used as a dispersion medium can be considered to have almost no influence on the environment as compared with gasoline.

When a drilling fluid containing hydrolyzable resin particles such as polylactic acid dispersed in water is filled in a winze and pressurized, the resin particles permeate an area in the vicinity of the winze and become a sealing material for the formed fractures to temporarily block a flow channel of a resource such as gas or oil effectively. To form new fractures, the fluid is also used as a diverting agent for switching a flow channel of a fracturing fluid. Further, since the fluid is hydrolyzed in the winze and disappears, the hydrolyzable particles do not need to be removed in a post-step, thereby making it possible to carry out the drilling of the winze efficiently.

By the way, a large number of studies have been made on the heat resistance and mechanical properties of a hydrolyzable resin such as polylactic acid but almost no studies are made on its particle shape.

For example, Patent Document 2 discloses a biodegradable resin composition (polylactic acid composition) comprising polylactic acid having a D-isomer content of 2 mass % or less and lamellar silicate. However, Patent Document 2 is aimed to improve the heat resistance and mechanical properties of this polylactic acid composition and does not investigate its particle shape at all.

Patent Document 3 discloses a powder comprising polylactic acid having a crystallinity of 30% or more. This polylactic acid powder has such high mechanical grindability that it can be particulated. However, Patent Document 3 does not investigate its particle shape as well.

Further, the inventors of the present invention proposed a polylactic acid composition which comprises low crystalline or amorphous polylactic acid having a crystallinity of 40% or less as a matrix and has a dispersion structure that an organically modified polysaccharide or swollen or expanded layered silicate salt is dispersed as a grinding accelerator in the matrix (Japanese Patent Application No. 2014-47835).

This polylactic acid composition has advantages that it has excellent mechanical grindability and is easily particulated at a low cost to be usable as an additive for drilling fluids. That is, since an agent to be added to a liquid, such as a drilling fluid which is used in a large quantity is used in a large quantity as a matter of course, the possibility of preparing it as fine particles which are easy to be injected into a liquid such as water and easy to handle at the time of injection at a low cost brings about a great benefit in terms of cost.

Although the mechanical grindability of particles used as an additive for drilling fluids is studied in the above previous application, the particle shape is not investigated at all as well.

PRIOR ART DOCUMENTS

Patent Documents

Patent Document 1: U.S. Pat. No. 7,833,950
Patent Document 2: Japanese Patent No. 3831278
Patent Document 3: Japanese Patent No. 5093834

DISCLOSURE OF THE INVENTION

The inventors of the present invention further proceeded with studies on the mechanical grindability of hydrolyzable resin particles used as the above-described additive for drilling fluids and found that the shapes of the obtained hydrolyzable resin particles exert a great influence on drilling properties and the sealability of a fracture extending from a winze.

That is, it is an object of the present invention to provide an additive for drilling fluids which comprises hydrolyzable resin particles, enhances the mobility in a winze of the hydrolyzable particles contained in a drilling fluid and can improve the sealability of a fracture extending from the winze.

Means for Solving the Problem

According to the present invention, there is provided a powder which comprises hydrolyzable resin particles, contains particles which do not pass through a sieve having an opening size of 500 μm in an amount of 50 mass % or more and has a repose angle of 51° or more.

In the powder of the present invention, preferably,
(1) the above hydrolyzable resin particles have a 16-mesh pass particle diameter;
(2) the powder has a bulk density of 0.30 to 0.54 g/ml;
(3) the above hydrolyzable resin is polylactic acid; and
(4) the powder is used as an additive for drilling fluids.

Effect of the Invention

The powder of the present invention comprises hydrolyzable resin particles, and a drilling fluid containing this has a feature that the powder has a large repose angle even when the particles have a predetermined diameter. The particularly important feature of the powder is that the powder has a content of particles which do not pass through a sieve having an opening size of 500 µm of 50 mass % or more, a large repose angle of 51° or more and a very low bulk density of 0.30 to 0.54 g/ml.

That is, the repose angle is a parameter indicative of friction between particles and resistivity to the movement of particles. A large repose angle means large friction between particles and the low mobility of particles. In addition, when the bulk density falls within the above small range, the particles are hardly filled densely and agglomerates of the particles are hardly compressed and have a hardly flowable shape.

Therefore, in a drilling fluid prepared by injecting the powder of the present invention into a fluid such as water, the powder particles (hydrolyzable resin particles) are hardly separated from one another and behave collectively. This behavior state of the particles is shown in a photo of FIG. 6. As a result, in the drilling fluid filled in the winze, the particles of this powder are existent collectively in part of the winze and move collectively when a pressure is applied to this drilling fluid, and this powder functions as a sealing material to temporarily seal a fracture and temporarily block a flow channel of a resource such as a gas or oil and a flow channel of a fracturing fluid. That is, by using this sealing material, the winze can be drilled efficiently.

In addition, when a fracture is formed as described above, some of the above powder particles (hydrolyzable particles) are pressed into the fracture. Since conventionally known polylactic acid particles have high flowability, they are removed from the inside of the fracture by the pressure of a resource gas flown into the winze from the fracture. As a result, this fracture is easily removed by pressure in the ground. On the other hand, the powder particles of the present invention have extremely low mobility and are therefore hardly removed from the inside of a fracture. In other words, they are apt to remain in the fracture and keep the sealing of the fracture effectively.

Therefore, the powder of the present invention can keep the formation and sealing of a fracture effectively with pressurization by applying a drilling fluid to a winze and can carry out the extraction of a resource such as a shale gas through this fracture effectively as an additive for drilling fluids.

The above additive for drilling has hydrolyzability like conventionally known additives and hydrolyzes swiftly after the extraction of a resource, thereby causing no environmental contamination.

Further, since the above additive for drilling has low mobility, it is hardly scattered, easy to handle and easily transported and injected into a liquid.

BEST MODE FOR CARRYING OUT THE INVENTION

<Particle Shapes>

The powder of the present invention is composed of particles having a predetermined particle diameter and has a predetermined range of repose angle. This particle diameter and this repose angle are derived from an extremely peculiar particle shape.

For example, as understood from an SEM photo of FIG. 2 which shows the particle shape of the powder prepared in Example 1 which will be described hereinafter, the particles of this powder include whiskered particles shown in FIG. 3 among particles having a rough surface with a small aspect ratio. Since the particles having a rough surface and the whiskered particles are mixed, the powder of the present invention has a predetermined particle diameter and a predetermined range of repose angle. The particles of the powder may include a plurality of particles for one whisker, a plurality of whiskers for one particle or a plurality of particles for a plurality of whiskers. This is because the entanglement of the particles of the powder is strengthened. In FIG. 3, particles are attached to both ends of one whisker.

That is, reflecting the above particle structure on repose angle and bulk density, the powder of the present invention contains 50 mass % or more of particles which do not pass through a sieve having an opening size of 500 µm and has an extremely large repose angle of 51° or more, specifically 55° or more and a low bulk density of 0.30 to 0.54 g/ml.

Figure 1:
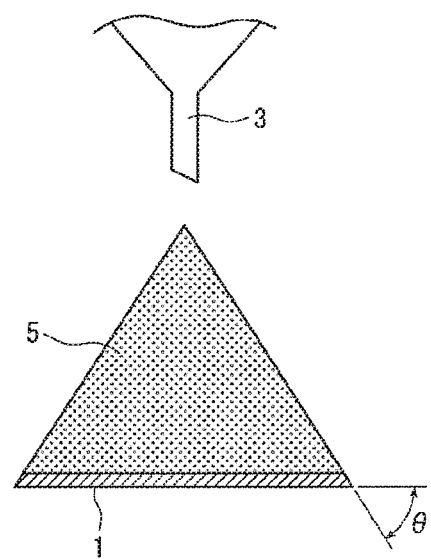
FIG. 1 is a diagram for explaining the repose angle of particles.

As shown in FIG. 1, the above repose angle is equivalent to the side face angle θ of a conical deposit 5 formed on a disk 1 having a predetermined size when an excessive amount of the powder (particulate) is dropped from a hopper 3 arranged at a fixed height from the disk 1. As this angle θ (repose angle) becomes larger, friction between particles become larger and the mobility of the particles becomes lower. This is because the existence of whiskered particles restricts the movement of other particles.

For example, even if the surface of each particle is rough, when the above whiskered particles are not existent, the repose angle of the powder is lower and the mobility of the particles is higher than those of the present invention (refer to Comparative Example 2 which will be described hereinafter and FIG. 7).

Further, as for the bulk density, the existence of whiskered particles inhibits the movement of other particles as well, whereby the bulk density falls within the above small range. This is because the particles hardly agglomerate densely. As the number of whiskered particles becomes larger, the bulk density value becomes smaller. For example, with reference to the powder of Comparative Example 2 (FIG. 5) in which whiskered particles are not existent, the bulk density is 0.55 g/ml which is much higher than that of the present invention. Since the movement of particles is not inhibited, particles readily agglomerate densely.

Since the powder of the present invention has the above particle shape, the mobility of the particles is low. The mobility of the particles appears in the behavior in water of the particles. That is, as understood from FIG. 6 and FIG. 7 which show the results of tests on the movement behaviors of particles in water which were carried out in Examples and Comparative Examples, the particles move collectively in water in the powders of Examples having the above particle shape whereas the particles move separate from one another in water in the powders of Comparative Examples which do not have the above particle shape.

In the powder of the present invention having the above-described particle shape, in general, when the powder is injected into a liquid such as water to be used as a drilling fluid, to make full use of a function obtained by the low mobility of the powder, it is desired that 16-mesh pass (opening size of 1,000 μm), preferably 20-mesh pass (opening size of 850 μm) fine particles should be prepared from the powder and further that 42-mesh (opening size of 355 μm) or less pass fine particles should be removed from the powder from the viewpoint of work efficiency.

<Material of Powder>

The powder of the present invention comprises hydrolyzable resin particles having the above particle shape. That is, since the hydrolyzable resin is used, after drilling, this additive for drilling fluids hydrolyzes and loses its particle shape, thereby making it possible to avoid an influence on the environment effectively. In a shallow site where an enzyme functions, the additive is also hydrolyzed by the enzyme, thereby making it possible to avoid an influence on the environment more effectively.

A water-insoluble hydrolyzable resin is used as the hydrolyzable resin. Since a water-soluble hydrolyzable resin cannot develop a function obtained by the above-described particle shape and has too high permeability into the ground and a large influence on the environment, it is not suitable as an additive for use in drilling fluids.

The water-insoluble hydrolyzable resin is preferably a resin which exhibits appropriate hydrozability at a temperature range of 40 to 200° C., as exemplified by polylactic acid, polyhydroxy alkanoate, polycaprolactone, polybutylene succinate, polybutylene succinate adipate, polybutylene terephthalate adipate, cellulose acetate, thermoplastic starch, polyoxalate and polyglycolic acid. They may be used as a copolymer, alone or in combination of two or more.

In this text, a polymer obtained by polymerizing at least one monomer with oxalic acid in a homopolymer, copolymer or blend material is considered as "polyoxalate".

Examples of the component forming the copolymer include polyhydric alcohols such as ethylene glycol, propylene glycol, butanediol, hexanediol, octanediol, dodecanediol, neopentyl glycol, glycerin, pentaerythritol, sorbitan, bisphenol A and polyethylene glycol; dicarboxylic acids and diesters thereof such as oxalic acid, succinic acid, adipic acid, sebacic acid, glutaric acid, decanedicarboxylic acid, cyclohexanedicarboxylic acid, terephthalic acid, isophthalic acid and anthracenedicarboxylic acid; hydroxycarboxylic acids such as glycolic acid, L-lactic acid, D-lactic acid, hydroxypropionic acid, hydroxybutyric acid, hydroxyvaleric acid, hydroxycaproic acid, mandelic acid and hydroxybenzoic acid; and lactones such as glycolide, caprolactone, butyrolactone, valerolactone, propiolactone and undecalactone.

In the present invention, polylactic acid, polyoxalate, polyglycolic acid and blends thereof are preferred as they exhibit suitable stability at 180° C. or lower and keep their particle shape stably during drilling work, and polylactic acid is most suitable as it is inexpensive and easily obtains the above particle shape by mechanical grinding.

Polylactic acid may be either 100% poly-L-lactic acid, 100% poly-D-lactic acid, a molten blend of poly-L-lactic acid and poly-D-lactic acid, or a random copolymer or block copolymer of L-lactic acid and D-lactic acid.

The above polylactic acid preferably has low crystallinity, for example, a crystallinity of 30% or less since the above-described particle shape is easily obtained by mechanical grinding. That is, polylactic acid having high crystallinity provides particles having a shape close to an angular shape when it is mechanically ground and it may be difficult to produce the above-described whiskered particles. This crystallinity is obtained from the melting enthalpy $\Delta Hm$ and crystallization enthalpy $\Delta Hc$ of polylactic acid measured by DSC and a crystal melting calorie of 93.6 (J/g) when polylactic acid is 100% crystallized based on the following equation.

$$\text{Crystallinity (\%)} = (\Delta Hm - \Delta Hc) \times 100/93.6$$

Further, this polylactic acid having low crystallinity is generally a molten blend of poly-L-lactic acid and poly-D-lactic acid, or a random copolymer or block copolymer of L-lactic acid and D-lactic acid, and the ratio (L:D) of L-lactic acid to D-lactic acid is generally 2:98 to 98:2.

The above-described hydrolyzable resin should serve as a sealing material when it is used as a fracturing fluid and should have a suitable molecular weight in terms of permeability into the ground, generally a weight-average molecular weight of 5,000 to 1,000,000, preferably 10,000 to 500,000.

In the present invention, the above hydrolyzable resin is mixed with a suitable compounding agent as required, particularly preferably a plasticizer or a compatible material to obtain the above-described particle shape by mechanical grinding.

A known plasticizer may be used as the plasticizer. Examples of the plasticizer include, not limited to, ester-based plasticizers such as dioctyl phthalate and benzyl-2-(2-methoxyethoxy)ethyl adipate and examples of the compatible material include cellulose-based materials such as cellulose propionate.

The above plasticizer or compatible material is preferably used in an amount of 1 to 20 parts by mass based on 100 parts by mass of the above hydrolyzable resin. When the amount of the plasticizer is too large, it is difficult to produce particles by mechanical grinding and when the amount of the plasticizer is too small or when the plasticizer is not used, even if particles can be produced by mechanical grinding, it is difficult to form whiskered particles.

Although other known compounding agents may be added to the hydrolyzable resin particles used in the present invention, they should be used as long as the production of particles accompanied by the formation of whiskered particles by mechanical grinding is not inhibited, and a compounding agent such as a pigment, filler or nucleus forming agent should be avoided as the production of particles is inhibited.

<Production of Powder>

The powder of the present invention which comprises the above-described water-insoluble hydrolyzable resin particles is produced by melt kneading together the above-described hydrolyzable resin with suitably formulated compounding agents in an extruder, pelletizing the extruded molten product to produce a pellet having a size of about 3 mm and mechanically grinding this pellet into particles.

In the present invention, the above mechanical grinding is carried out by dry system. That is, mechanical grinding using a liquid medium makes it difficult to form whiskered particles. Probably, it is assumed that a load applied to each pellet becomes even in wet grinding with the result that the formation of whiskered particles becomes difficult. That is, it is believed that a load applied to pellets and heat generation tend to become localized in dry grinding, resulting in the formation of whiskers.

Further, it is desired that the above mechanical grinding should be carried out by keeping the pellets to be ground at a temperature close to normal temperature of 20 to 100°. For example, when it is carried out under heating, it may be difficult to produce particles by mechanical grinding. When the pellets are mechanically ground while they are kept frozen like freeze grinding, mechanical grindability is enhanced more than required with the result that it is difficult to form whiskered particles even if particles can be produced.

The grinding time and the grinding pressure are set to ensure that whiskered particles are formed according to the specifications of a grinder in use by conducting preliminary tests.

The powder obtained by the above mechanical grinding is classified to a suitable size by putting it through a sieve, injected into a drilling fluid typified by water and used for the extraction of an underground resource. The amount of the powder injected is preferably 0.01 to 20 wt %, particularly preferably 0.01 to 10 wt % based on the liquid medium (for example, water) in order to carry out the drilling of a winze or hydraulic fracturing smoothly by using this drilling fluid.

When the powder of the present invention is used as an additive for drilling fluids, since the mobility of the particles is low and the particles are not separated from one another and move collectively in a liquid medium, it is very effective as a sealing material for hydraulic fracturing. Further, as it has the function of keeping a fracture formed by hydraulic fracturing effectively, it can carry out the extraction of a resource effectively.

EXAMPLES

The following examples are provided to illustrate the excellent effect of the present invention.

Polylactic acid (PLA) used in the following experiments, types of compounding agents and the evaluation of characteristic properties are given below.
Polylactic Acid (PLA);
Revode 101 polylactic acid of ZHEJIANG HISUN BIO-MATERIALS CO., LTD.
content of D-isomer: 4%
melting point: 155° C.
weight-average molecular weight (Mw): 200,000
Plasticizer;
Daifatty-101 (benzyl-2-(2-methoxyethoxy)ethyl adipate) of Daihachi Chemical Industry Co., Ltd.
Compatible material; cellulose propionate of Sigma-Aldrich Co., LLC.
Others;
S-BEN E organically treated bentonite (grinding accelerator) of HOJUN Co., Ltd.
<Measurement of Bulk Density>
Particles are dropped into a 100 ml stainless container to measure the weight so as to calculate bulk density (g/ml) from this weight.
<Measurement of Repose Angle>
This was measured by using the powder tester of Hosokawa Micron Corporation.
Measurement Conditions;
Disk diameter: 80 mm
Height of hopper (distance between hopper and disk): 20 cm
<Movement Behavior in Water of Particles>
A 500 ml DURAN bottle was filled with distilled water, and 1 g of sample particles was added and precipitated.
The DURAN bottle was inclined at 135° to observe the movement behavior of the particles. ◯ indicates that it is recognized that 50 wt % or more of particles move collectively and X indicates that it is recognized that the particles move separate from one another.

<Size of Particles>
The particles were put through a sieve having an opening size of 500 μm, and the proportion of particles remaining on the sieve was calculated.

(mass of particles on 500 μm sieve/mass of all particles)×100

Example 1

15 parts by mass of a plasticizer (Daifatty-101) and 100 parts by mass of PLA were blended and melt mixed together by means of a double-extruder (ULT Nano05-20AG of Technovel Corporation) at 200° C., and the molten extruded product was pelletized to produce a master pellet.

The master pellet produced above was ground by using a mechanical grinder (Spiral Mill of Seishin Enterprise Co., Ltd.) under the following conditions.
Clearance between fixed blade and rotary blade: 3 mm
Number of passes: one
The obtained particles were classified between a 20-mesh (opening size of 850 μm) sieve and a 42-mesh (opening size of 355 μm) sieve to obtain a powder.

The obtained powder was measured for bulk density, repose angle and mobility in water, and the measurement results are shown in Table 1.

Figure 2:
FIG. 2 shows an SEM photo of the particle shape of the powder of the present invention prepared in Example 1 (20 magnifications)
Figure 3:
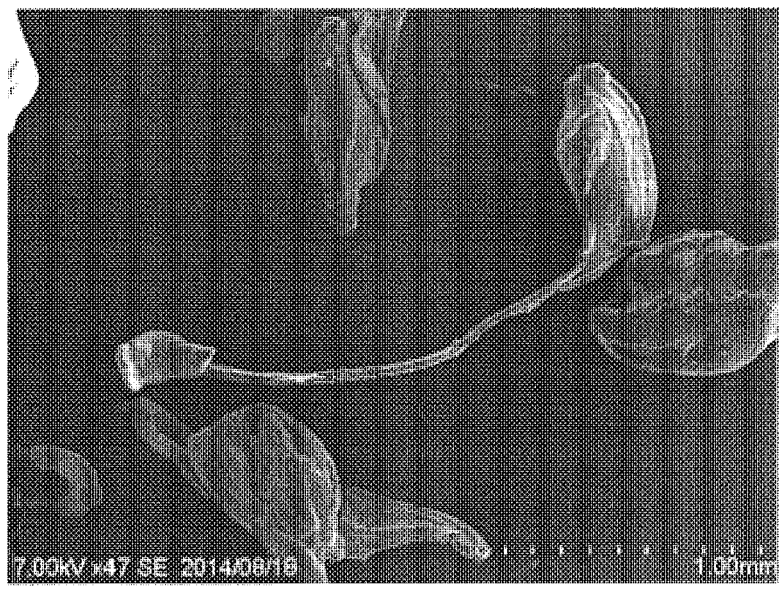
FIG. 3 shows an SEM photo of whiskered particles included in the particles of the powder of Example 1 (47 magnifications)

An SEM photo of this powder taken at 20 magnifications is shown in FIG. 2, and further an SEM photo (47 magnifications) of whiskered particles observed in this powder is shown in FIG. 3.

Figure 6:
FIG. 6 shows a photo of the movement behavior in water of the powder of Example 1.

A photo showing mobility in water is shown in FIG. 6.

Example 2

A powder was obtained in the same manner as in Example 1 except that 100 parts by weight of PLA and 3 parts by mass of cellulose propionate (compatible material) were blended.

The obtained powder was measured for bulk density, repose angle and mobility in water, and the measurement results are shown in Table 1. In the mobility test in water, the particles exhibited the behavior of moving collectively, which was not so remarkable as in Example 1.

Figure 4:
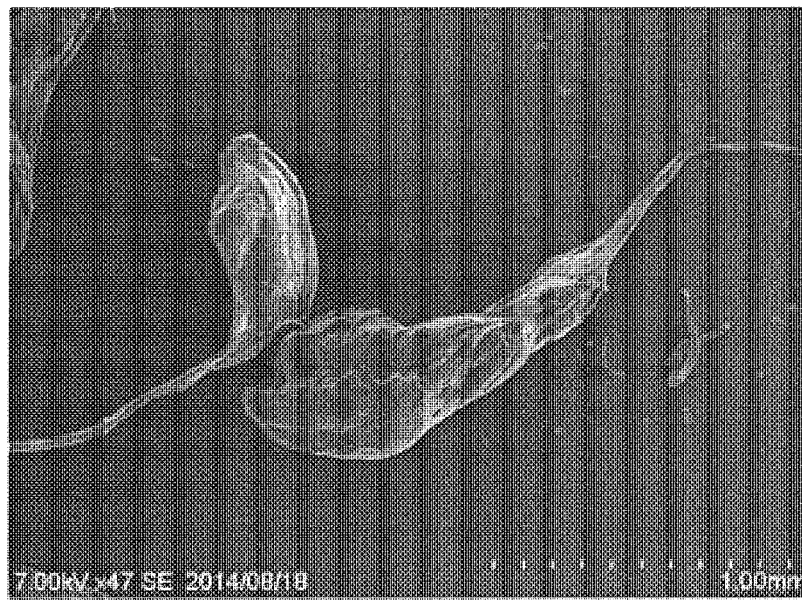
FIG. 4 shows an SEM photo of whiskered particles included in the particles of the powder of the present invention prepared in Example 2 (47 magnifications)

An SEM photo (47 magnifications) of whiskered particles observed in this powder is shown in FIG. 4.

Comparative Example 1

A master pellet of PLA alone was immersed in liquid nitrogen to be frozen, and this frozen product was mechanically ground by using the same mechanical grinder as in Example 1 and classified in the same manner as in Example 1 to obtain a powder. The crystallinity of the powder was 34%.

The obtained powder was measured for bulk density, repose angle and mobility in water, and the measurement results are shown in Table 1.

Comparative Example 2

A powder was obtained in the same manner as in Comparative Example 1 except that 100 parts by mass of PLA and 3 parts by mass of S-BEN E (grinding accelerator) were blended. The crystallinity of the powder was 38%.

The obtained powder was measured for bulk density, repose angle and mobility in water, and the measurement results are shown in Table 1.

Figure 5:
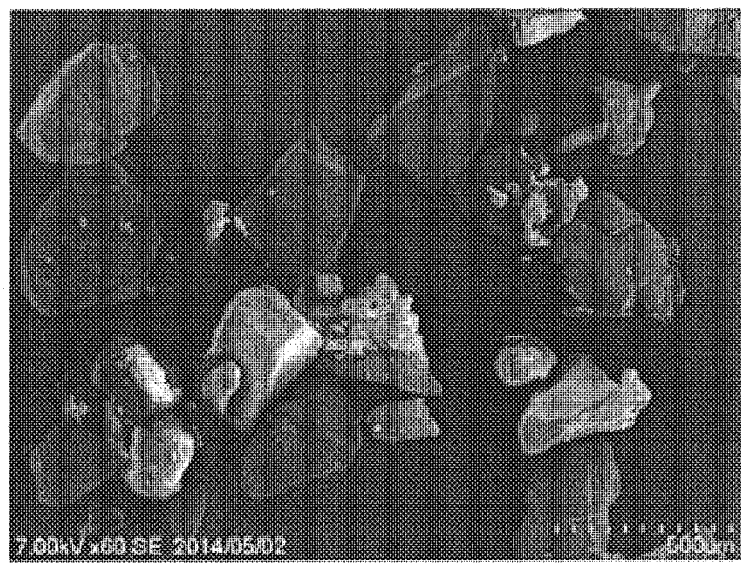
FIG. 5 shows an SEM photo of the particle shape of the powder of Comparative Example 2 (60 magnifications)
Figure 7:
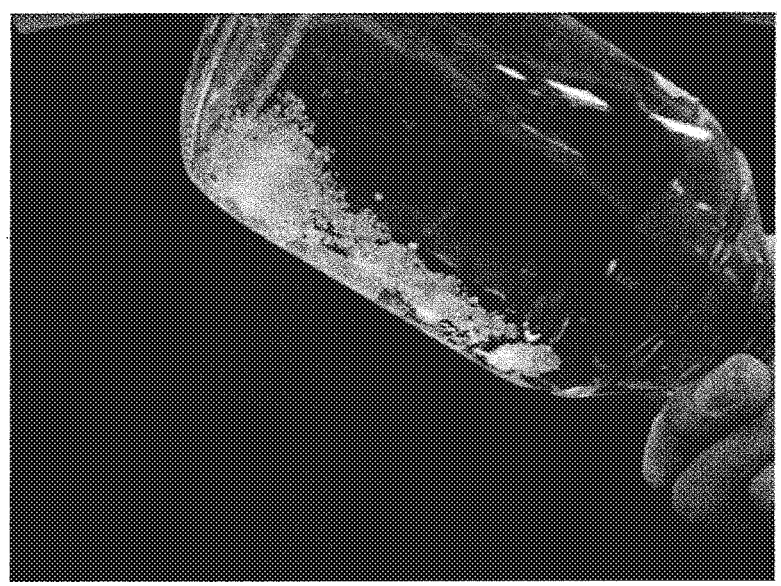
FIG. 7 shows a photo of the movement behavior in water of the powder of Comparative Example 1.

An SEM photo (60 magnifications) of this powder is shown in FIG. 5 and a photo showing mobility in water is shown in FIG. 7.

TABLE 1

|  | Compounding agent | Amount | Grinding method | Bulk density (g/ml) | Repose angle (°) | Particle mobility | * |
|---|---|---|---|---|---|---|---|
| Ex. 1 | Daifatty-101 | 15 | normal temperature | 0.45 | 57.9 | ○ | 72 |
| Ex. 2 | Cellulose propionate | 3 | normal temperature | 0.43 | 53.4 | ○ | 79 |
| Comp. Ex. 1 | — | — | freeze | — | 49.8 | x | — |
| Comp. Ex. 2 | S-BEN E | 3 | freeze | 0.55 | 50.7 | x | 83 |

* Proportion of particles passing through an opening size of 500 μm (mass %)

EXPLANATION OF NUMERALS

1: supporting powder disk
3: hopper
5: deposit

The invention claimed is:

1. A powder comprising hydrolyzable resin particles, containing particles which do not pass through a sieve having an opening size of 500 μm in an amount of 50 mass % or more and having a repose angle of 51° or more, wherein the hydrolyzable resin is polylactic acid.

2. The powder according to claim 1, wherein the resin particles have a 16-mesh pass particle diameter.

3. The powder according to claim 1 which has a bulk density of 0.30 to 0.54 g/ml.

4. The powder according to claim 1, wherein the polylactic acid has a crystallinity of 30% or less.

5. The powder according to claim 1 which is used as an additive for drilling fluids.

6. The powder according to claim 1 which is used as an additive for excavation.

* * * * *